F. H. CURRY.
CONVEYING APPARATUS FOR OVENS, DRYING ROOMS, AND THE LIKE.
APPLICATION FILED NOV. 21, 1919.
1,382,957.
Patented June 28, 1921.
2 SHEETS—SHEET 1.
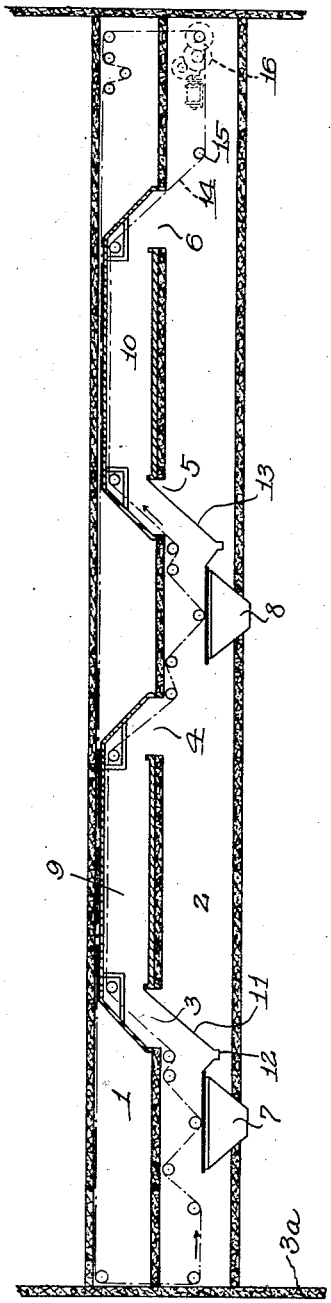
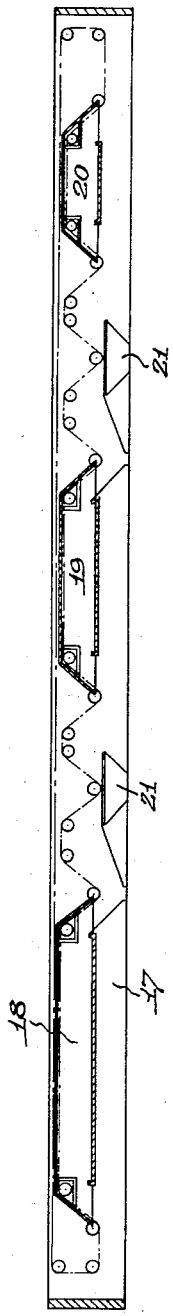
Inventor
Frederick H. Curry,
By
Attorneys

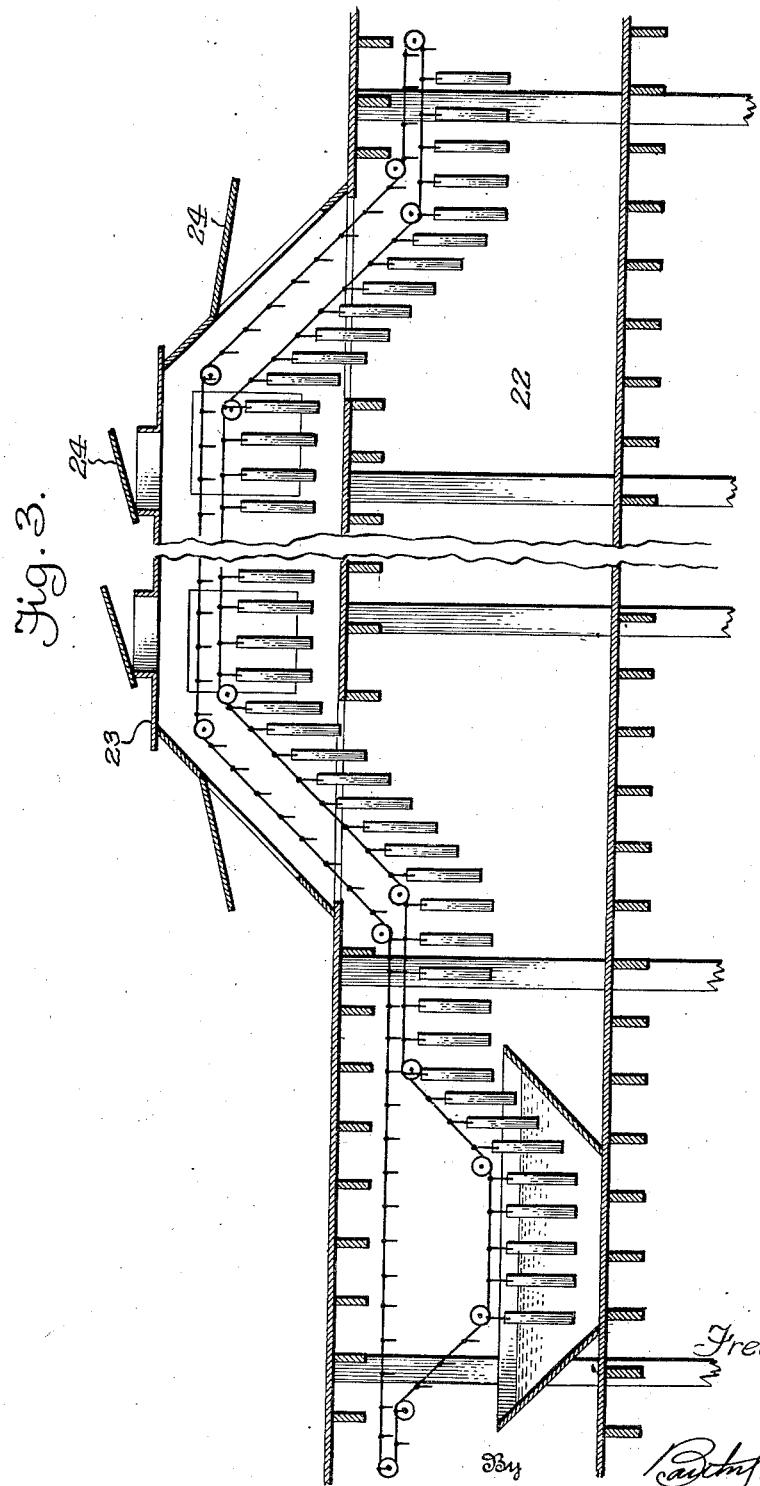

UNITED STATES PATENT OFFICE.

FREDERICK H. CURRY, OF DETROIT, MICHIGAN, ASSIGNOR TO YOUNG BROTHERS COMPANY, OF DETROIT, MICHIGAN, A CORPORATION OF MICHIGAN.

CONVEYING APPARATUS FOR OVENS, DRYING-ROOMS, AND THE LIKE.

1,382,957.   Specification of Letters Patent.   Patented June 28, 1921.

Application filed November 21, 1919. Serial No. 339,771.

*To all whom it may concern:*

Be it known that I, FREDERICK H. CURRY, a citizen of the United States of America, residing at Detroit, in the county of Wayne and State of Michigan, have invented certain new and useful Improvements in Conveying Apparatus for Ovens, Drying-Rooms, and the like, of which the following is a specification, reference being had therein to the accompanying drawings.

In the manufacture of automobile parts, especially bodies, fenders and metallic parts that are rendered rust proof, painted, enameled or otherwise finished, it is essential that such treatment of the vehicle parts be expeditiously and economically practised so that the production and efficiency of an automobile manufacturing plant may be at the maximum. It is also essential that the treatment of metallic parts be safely carried on without any danger of spontaneous combustion, fires, or asphyxiation due to gases, fumes and heat that may be generated by the volatile liquids or substances used during the treatment.

In order that the finishing department of an automobile plant may be operated at a maximum and thereby contribute to the production of the plant, I have devised a novel method and conveyer apparatus by which automobile parts may be treated to insure a uniform finish and a desired finish. The method involves the successive treatment of metallic parts to produce a desired finish, and the treatment may include dipping, spraying or otherwise supplying coats of paint or varnish to the automobile parts; drying, baking, or otherwise heat treating the parts after being coated, and in some instances cleaning the parts prior to being coated. There are other treatments that may be necessary, depending on the particular automobile part, and the apparatus for carrying this method into effect involves conveyers of various forms, coating and drip collecting tanks or basins; ovens, chambers and vestibules arranged to successively receive the automobile parts, and an arrangement by which the apparatus will occupy a comparatively small space and permit of operations being expeditiously performed.

My invention will be hereinafter more fully considered, and then claimed, and reference will now be had to the drawings, wherein—

Figure 1 is a longitudinal sectional view of a portion of a building having an apparatus in accordance with my invention which occupies parts of superposed floors in the building;

Fig. 2 is a diagrammatic view of an apparatus designed for one floor of a building;

Fig. 3 is an enlarged longitudinal sectional view of a portion of an apparatus along the lines of that suggested in Fig. 1.

Since no two factories for the manufacture of automobiles or automobile parts are alike, and available floor space varies in area and shape, it is obvious that an apparatus must be especially designed for the manufacturing plant where it is to be used. Sometimes, as in the case of a new plant, it is built into the plant, and at other times designed to occupy a defined space in the plant or floors added thereto. It is therefore apparent that my apparatus cannot be confined to any specific arrangement and the same holds true in the method, since one automobile may require a better finish than another, or one part a different treatment from another, therefore my invention must receive as broad an interpretation as is possible in view of the appended claims.

A great many plants have been equipped with an apparatus in accordance with my invention and the method is in practice at the present time for treating automobile bodies, fenders and other metallic parts, and in some of these plants the upper floor or roof of the building are utilized as the best available space, it being possible to isolate such space from the remainder of the plant as a safety factor. For instance, in Figs. 1, 2 and 3 I show an apparatus that may occupy the upper superposed floors of a building, as in Fig. 1; a single floor as in Fig. 2, and the upper floor and a portion of the roof as shown in Fig. 3. Considering the arrangement shown in Fig. 1 the compartments or rooms 1 and 2 represent superposed floors of the building 3, and the floor of the compartment 1 or the ceiling of the compartment 2 has a series of openings 3, 4, 5 and 6. Adjacent the opening 3 in the compartment 2, is placed a tank or basin 7 which may be considered a first coat tank, and between the openings 4 and 5 in the same compartment may be placed a second coat tank 8, the tanks 7 and 8 containing a paint, varnish or other liquid substance into which metallic parts are adapted to be dipped so as to be coated by the contents of the tank.

In the compartment 1, between the openings 3 and 4 and the openings 5 and 6 are placed ovens 9 and 10, the former being considered a first coat oven and the latter a second coat oven. These ovens are adapted for drying or baking coated metallic parts and the drying may be accomplished by ventilation in connection with the oven or heat therein, while the baking of such parts is obtained by heat alone.

Connecting the rear edge of the first coat tank 7 to the front end of the first coat oven 9 is a drip basin 11 having a drain trough 12, and a similar basin connects the rear edge of the first coat tank 8 to the front edge of the second coat oven 10.

For dipping metallic parts into the tanks 7 and 8 and conveying said parts to the ovens 9 and 10, an endless conveyer 14 is employed which is trained over suitable sheaves, pulleys or guides 15 and operated from a motor driven mechanism 16 located at one end of the compartment 2. The pulleys, sheaves or guides 15 are disposed in the compartments 1 and 2 and the ovens 9 and 10 so that the endless conveyer will be in position at one end of the compartment 2 to permit of parts being attached to the conveyer or the conveyer otherwise loaded and at the opposite end of the compartment 2 the conveyer may be unloaded. The conveyer is adapted to conduct parts into the first coat tank 7 and out of said tank over the basin 11 where excess paint, varnish or other liquid may drain from the part prior to passing into the first coat oven 9. Beyond this oven the parts receive another dipping in the second coat tank 8, are drained over the basin 13, pass through the second coat oven 10 to the unloading point of the conveyer. It is now apparent that the coating tank and the oven only occupy a portion of the floors of compartments 2 and 1, leaving space available for other purposes, which when so used may be partitioned from those portions of the compartment 2 containing the tanks 7 and 8, thereby preventing gases or fumes liberated by the tanks or coated parts from spreading throughout the compartment or floor 2. The first and second coat ovens are preferably closed, especially for a heat treatment, and I attach considerable importance to the arrangement of the ovens relative to the tanks since the conveyer 14 has portions thereof operated at an angle to other portions, thus permitting of metallic parts being suspended from the conveyer without contacting with each other, as best shown in Fig. 3. Such a conveyer permits of the tanks and ovens being constructively arranged in a comparatively short space, as it is not necessary to maintain the greater part of the conveyer in a horizontal plane as would be the case if the ovens were placed in the same plane as the tanks.

Where a floor or compartment is of considerable depth or small parts are to be treated it is possible to arrange the ovens and tanks as shown in Fig. 2. The compartment 17 has ovens 18, 19 and 20 adjacent its ceiling and the tanks 21 on its floor, the ovens 18 and 19 being employed for drying and baking after the parts have been coated in the tank 21, and the oven 20 may be employed simply for drying purposes after the parts have been cleaned preparatory to receiving a bath in the tanks 21; the conveyer in this instance operates in an opposite direction from that shown in Fig. 1.

Fig. 3 imparts a better idea of the endless conveyer when operated in a compartment 22 which may represent the top floor of a building so that a drying oven 23 may be erected on the roof of the building to receive coated or otherwise treated parts carried by the conveyer. The oven 23 may have suitable ventilators 24 so that a draft of air may be naturally or artificially maintained in the oven, and it is obvious that the compartment 22 can be partitioned off so as to isolate the coating tank and the oven 23 and thus permit obnoxious fumes or gases to escape to the atmosphere.

As will be seen, the supporting means for the conveyer includes a flight which carries the articles through the coat-applying station—shown as the dipping station, a flight extending in the direction of length of the oven, and an intermediate flight which is inclined upwardly and forwardly in the direction of travel of the conveyer, this intermediate flight being located above the drippings collecting portion 11.

This arrangement provides for positive advantages in a system of this type in that the articles can be supported in comparatively close formation regardless of vertical length and at the same time the drippings from an article are kept from passing on to another one of the articles. The first of these advantages will be understood from the fact that where the travel includes a flight extending in a true vertical plane the vertical length of the articles being treated will control the spacing along the conveyer, since the articles are carried in such manner through the vertical flight that more than one of the articles is located on the same plane. By the arrangement shown, this difficulty is eliminated, since two successive articles are not located on the same plane vertically throughout the travel through the flights. Another advantage in this is to be found in the fact that the intermediate flight of this character permits the use of the "bottom" opening form of oven with its advantages, without materially lengthening the conveyer structure. And the fact that none of the succession of articles is located in superposed relation to another article so as to be directly above it, permits each article to have its drippings taken care of without affecting another article, whether the drippings result from excess coating material applied during the coating operation or through the tendency to drip set up when the articles enter the oven.

From the foregoing it will be observed that I may first clean an automobile part, dry it, then dip it for a first coat, dry or bake the first coat, dip it for another coat and dry or bake the second coat, all of which is successively carried on in a minimum space, without one piece of material or article interfering with another, without there being any danger of conflagration and without much handling by laborers.

What I claim is:

1. In systems for applying coatings to articles under quantity production conditions, and wherein a succession of articles are subjected to coat-applying and heat treatment operations in automatic succession, a coat-applying station, an oven structure out of vertical alinement with the station, a continuous conveyer adapted to support the articles being treated, and means for supporting the conveyer to provide a flight passing the coat-applying station and a flight extending in the direction of length of the oven, with the plane of the latter flight above that of the first flight, said flights being connected by an intermediate flight inclined forwardly and upwardly in the direction of conveyer advance.

2. In systems for applying coatings to articles under quantity-production conditions, and wherein a succession of articles are subjected to coat-applying and heat-treatment operations in automatic succession, a coat-applying station, an oven structure, a continuous conveyer adapted to support the articles being treated, means for supporting the conveyer to provide a flight passing the coat-applying station and a flight extending in the direction of length of the oven, with the plane of the latter flight above that of the first flight, said flights being connected by an intermediate flight inclined forwardly and upwardly in the direction of conveyer advance, and means underlying the intermediate flight operative to collect drippings from the coated articles during travel from such station to the oven.

3. A sytem of the type of claim 2, characterized in that the drippings collecting means is in the form of a wall extending in the general direction of the intermediate flight, with the lower portion of the wall leading to a drippings well.

In testimony whereof I affix my signature in the presence of two witnesses.

FREDERICK H. CURRY.

Witnesses:
J. L. VETTE,
O. F. BARTHEL.